United States Patent
Xu et al.

(10) Patent No.: US 12,379,314 B2
(45) Date of Patent: Aug. 5, 2025

(54) METHOD AND APPARATUS FOR MEASURING SURFACE GLOSS AND SPECTRAL REFLECTANCE

(71) Applicant: Datacolor, Inc., Lawrenceville, NJ (US)

(72) Inventors: Zhiling Xu, Princeton Junction, NJ (US); Nilesh B. Dhote, Ewing, NJ (US); David Williams, Westampton, NJ (US); Seaver Li, Belle Mead, NJ (US); William Binder, Lakeville, PA (US); Venkata R. Thumu, Pennington, NJ (US)

(73) Assignee: Datacolor, Inc., Lawrenceville, NJ (US)

( * ) Notice: Subject to any disclaimer, the term of this patent is extended or adjusted under 35 U.S.C. 154(b) by 263 days.

(21) Appl. No.: 17/931,895

(22) Filed: Sep. 13, 2022

(65) Prior Publication Data

US 2024/0085323 A1    Mar. 14, 2024

(51) Int. Cl.
*G01N 21/57* (2006.01)
*G01N 21/25* (2006.01)

(52) U.S. Cl.
CPC .......... *G01N 21/57* (2013.01); *G01N 21/251* (2013.01); *G01N 2201/062* (2013.01); *G01N 2201/127* (2013.01)

(58) Field of Classification Search
CPC ................ G01N 21/57; G01N 21/251; G01N 2201/127; G01N 2201/062; G01N 23/20016
See application file for complete search history.

(56) References Cited

U.S. PATENT DOCUMENTS

| | | | |
|---|---|---|---|
| 5,377,000 A * | 12/1994 | Berends | G01J 3/51 356/73 |
| 10,444,074 B1 | 10/2019 | Xu et al. | |
| 10,768,098 B2 | 9/2020 | Xu | |
| 11,340,156 B2 | 5/2022 | Xu | |

(Continued)

FOREIGN PATENT DOCUMENTS

| | | | | |
|---|---|---|---|---|
| WO | WO-2019211484 A1 * | 11/2019 | | G01J 3/0202 |
| WO | WO-2020117460 A1 * | 6/2020 | | G01J 3/463 |

OTHER PUBLICATIONS

Farhad Moghareh Abed et al., Geometry-Independent Target-Based Camera Colorimetric Characterization, Oct. 2013, Journal of Imaging Science and Technology 57(5): 050503-1-050503-15, 2013, pp. 1-15 (Year: 2013).*

(Continued)

*Primary Examiner* — Jamil Ahmed

(57) ABSTRACT

A method includes controlling a gloss channel of a color measurement apparatus to measure a surface gloss of a color sample to generate a gloss value for the color sample. A color channel of the color measurement apparatus is controlled to measure a reflectance spectrum of the color sample to generate a first plurality of reflectance values for the color sample under a first measurement geometry. The first plurality of reflectance values are converted to a second plurality of reflectance values representing the reflectance spectrum of the color sample under a second measurement geometry, different from the first measurement geometry. The converting utilizes an adjustment that is a function of the gloss value.

20 Claims, 3 Drawing Sheets

(56) References Cited

U.S. PATENT DOCUMENTS

2021/0381896 A1 12/2021 Xu et al.
2022/0003671 A1* 1/2022 Ghosh .................. G01N 21/293

OTHER PUBLICATIONS

ITO, CN103369189, machine translation and publication, 2013 (Year: 2013).*

"Understanding Datacolor Gloss Compensation, A Technical Report On Gloss and Datacolor's Gloss Compensation," accessed on Jul. 10, 2023, https://repo.chromachecker.com/pdf/display/L7rYGO/EN/manual_color_inspector_report_options.

* cited by examiner

METHOD AND APPARATUS FOR MEASURING SURFACE GLOSS AND SPECTRAL REFLECTANCE

FIELD OF THE DISCLOSURE

The present invention generally relates to the measurement of color, and more specifically relates to the measurement of surface gloss and spectral reflectance of color samples.

BACKGROUND

In many industries, including textiles, coatings, and others, color is considered to be an important property of an object or product. Much effort is made in these industries to ensure accurate measurement and reproduction of specific colors. Dedicated instruments, such as colorimeters and spectrophotometers, are often used to measure the color values of samples, and various techniques have been developed to improve the measurement performances of these instruments.

SUMMARY OF THE DISCLOSURE

In one example, a method performed by a processing system including at least one processor includes controlling a gloss channel of a color measurement apparatus to measure a surface gloss of a color sample to generate a gloss value for the color sample, controlling a color channel of the color measurement apparatus to measure a reflectance spectrum of the color sample to generate a first plurality of reflectance values for the color sample under a first measurement geometry, and converting the first plurality of reflectance values to a second plurality of reflectance values representing the reflectance spectrum of the color sample under a second measurement geometry, different from the first measurement geometry, wherein the converting utilizes an adjustment that is a function of the gloss value.

In another example, a non-transitory computer-readable medium stores instructions. When executed by a processing system including at least one processor, the instructions cause the processing system to perform operations. The operations include controlling a gloss channel of a color measurement apparatus to measure a surface gloss of a color sample to generate a gloss value for the color sample, controlling a color channel of the color measurement apparatus to measure a reflectance spectrum of the color sample to generate a first plurality of reflectance values for the color sample under a first measurement geometry, and converting the first plurality of reflectance values to a second plurality of reflectance values representing the reflectance spectrum of the color sample under a second measurement geometry, different from the first measurement geometry, wherein the converting utilizes an adjustment that is a function of the gloss value.

In another example, an apparatus includes a processing system including at least one processor and a non-transitory computer-readable medium storing instructions which, when executed by the processing system, cause the processing system to perform operations, the operations comprising controlling a gloss channel of a color measurement apparatus to measure a surface gloss of a color sample to generate a gloss value for the color sample, controlling a color channel of the color measurement apparatus to measure a reflectance spectrum of the color sample to generate a first plurality of reflectance values for the color sample under a first measurement geometry, and converting the first plurality of reflectance values to a second plurality of reflectance values representing the reflectance spectrum of the color sample under a second measurement geometry, different from the first measurement geometry, wherein the converting utilizes an adjustment that is a function of the gloss value.

BRIEF DESCRIPTION OF THE DRAWINGS

The teachings of the present disclosure can be readily understood by considering the following detailed description in conjunction with the accompanying drawings, in which.

DETAILED DESCRIPTION

Figure 1:
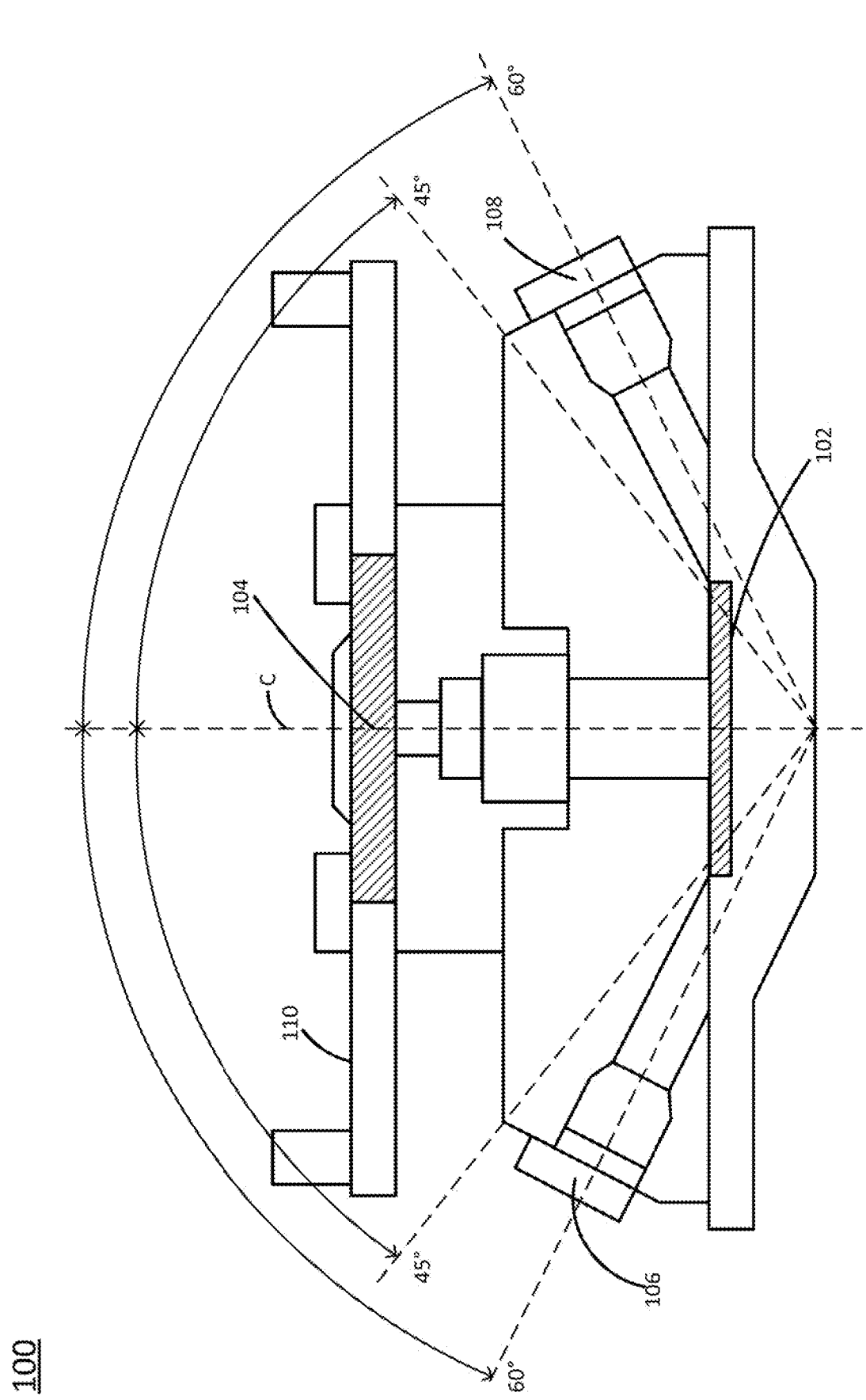
FIG. 1 illustrates a simplified cross-sectional view of an apparatus for simultaneously measuring the surface gloss and reflectance spectrum of a color sample, according to examples of the present disclosure.

In one example, the present invention includes a method, apparatus, and non-transitory computer-readable medium for measuring the surface gloss and spectral reflectance of a color sample. As discussed above, color is considered to be an important property of an object or product in many industries, including textiles, coatings, and others. Much effort is made in these industries to ensure accurate measurement and reproduction of specific colors. Dedicated instruments, such as colorimeters and spectrophotometers, are often used to measure the color values of samples, and various techniques have been developed to improve the measurement performances of these instruments.

However, many physical factors can affect the way that color is seen and measured, both by the human eye and by sophisticated color measurement instruments. One physical factor that can affect color measurement is gloss, i.e., the amount of light reflecting off of the surface of a sample. Many products, including paints, plastics, inks, and cosmetics, are designed to have different levels of gloss. The surface gloss of a sample will impact the color measurement of the sample (e.g., the measured reflectance values), depending upon the measurement geometry of the color measurement instrument. For instance, two samples of the same black material exhibiting different degrees of surface gloss may show similar luminance Y values under the diffuse lighting, 8 degrees observe angle (d/8) specular reflectance included (SCI) measurement geometry, but may show different luminance Y values under the d/8 specular reflectance excluded (SCE) and 45/0 measurement geometries.

Typically, the color measurement output (e.g., channel responses or reflectance values) of a color measurement instrument is determined by the geometry of the instrument; thus, only the color information under the geometry of the color measurement instrument can be obtained. Some color measurement techniques account for gloss by measuring the surface gloss of a color sample separately from measuring the color, in order to obtain the proper reflectance spectrum of the sample. However, this adds additional time and operational costs, and can be confusing for end users operating the color measurement instruments.

Examples of the present disclosure provide a method and color measurement apparatus for effectively and simultaneously measuring the surface gloss and the color of a color sample. Further examples of the method and apparatus are also able to obtain the reflectance spectrum of the sample under various measurement geometries, including measurement geometries that are different from the measurement geometry of the color measurement apparatus. The measured surface gloss of a color sample can be used to improve the color measurement accuracy of the method and apparatus. One example of the color measurement apparatus includes a gloss sensor and a multi-band color sensor, as well as corresponding light sources for both the gloss sensor and the color sensor.

During training of the color measurement apparatus, a plurality of calibration samples having known gloss values is measured, and the raw counts of the gloss sensor are adjusted to match the known gloss values. In a further example, a plurality of calibration color standards is also used during the training, where the calibration color standards may have various surface gloss properties which may be different from the samples the color measurement apparatus is being trained to measure. The gloss values and the raw counts of the color sensor may be collected by measuring each color calibration standard of the plurality of calibration color standards, and then adjusting the raw counts of the color sensor for each color sample being measured. The adjusted raw counts of the color sensor may be utilized to construct a transformation matrix which can be used by the color measurement apparatus to simultaneously measure the surface gloss and color having varying levels of surface gloss. The surface gloss and color can be converted into reflectance spectra of the color samples under different geometries.

To further aid in understanding the present disclosure, FIG. 1 illustrates a simplified cross-sectional view of an apparatus 100 for simultaneously measuring the color and reflectance spectrum of a color sample, according to examples of the present disclosure. In one example, the apparatus 100 may be a 45/0 spectrophotometer. In one example, the measurement apparatus 100 comprises eight color bands (e.g., wavelength ranges of the color sensor response) composed by spectrally different sensor sensitivities. In a further example, the eight color bands may be augmented by flashing, spectrally different subsets of light emitting diodes (LEDs) around a forty-five degree ring.

More specifically, the apparatus generally comprises at least one color light source 102, at least one color sensor 104, at least one gloss light source 106, and at least one gloss sensor 108. The color light source 102, the color sensor 104, the gloss light source 106, and the gloss sensor 108 may all be contained within a single housing 110 of the apparatus 100.

In one example, the color light source 102 may comprise an array of color LEDs (individual LEDs not shown in FIG. 1) that is positioned at a first end of a central optical axis C of the apparatus 100. In one example, the array comprises six color LEDs, where each color LED of the six color LEDs is positioned to emit light at a forty-five degree angle relative to the central optical axis C.

In one example, the color sensor 104 is positioned at a second end of the central optical axis C of the apparatus 100, opposite from the color light source 102. Thus, the color sensor 104 may be positioned at zero degrees relative to the central optical axis C. In one example, the color sensor 104 comprises an eight-band spectral sensor. Collectively, the color light source 102 and the color sensor 104 may form a color channel of the apparatus 100. In one example, the color channel may have a 45/0 geometry, where the color light source 102 provides forty-five-degree illumination of a color sample, and the color sensor 104 performs zero-degree measurement of the reflectance of the color sample at different wavelengths.

In one example, the gloss light source comprises an LED. In a further example, the gloss light source 106 is positioned to emit light at a sixty degree angle relative to the central optical axis C.

In one example, the gloss sensor may comprise a photodiode. In a further example, the gloss sensor 108 may be positioned one hundred twenty degrees from the gloss light source 106 (i.e., such that the gloss sensor 108 is positioned at the specular direction opposite of the gloss light source 106). Thus, collectively, the gloss light source 106 and gloss sensor 108 may form a sixty-degree gloss channel of the apparatus 100. In one example, additionally gloss light source/gloss sensor pairs may be deployed in the apparatus 100, as long as the gloss light source and gloss sensor of each pair are located one hundred twenty degrees apart from each other (and at sixty degrees relative to the central optical axis C).

It should be noted that the system 100 has been simplified. Thus, the system 100 may be implemented in a different form than that which is illustrated in FIG. 1 (e.g., may include additional components not illustrated in FIG. 1, such as lenses, mirrors, image capturing devices, processing systems, memory, a network interface, input/output devices, and the like) without departing from the scope of the present disclosure.

The gloss channel of the apparatus 100 may need to be calibrated before the apparatus 100 can be used to directly measure the surface gloss of a sample. In one example, the gloss channel may be calibrated by using the apparatus 100 to measure the surface glosses of a gloss ladder (i.e., a plurality of calibration samples having known gloss values). A relationship between the known gloss values of the gloss ladder and the raw counts of the gloss sensor 108 can then be derived (e.g., through polynomial fit or other means), and this relation may be used as a transform to convert raw counts of the gloss sensor 108 to gloss values for subsequently measured samples.

Color measurement results (e.g., channel responses or reflectance values) by the color channel of the apparatus 100 may be sensitive to surface gloss. In other words, the color measurement result of the color sensor 104 may be skewed by the surface gloss of the sample whose color is being measured, such that the color measured by the color sensor 104 does not correspond to the true color of the color sample. In one example, one or more of a variety of techniques may be implemented to compensate for the effects of surface gloss on color measurement by the color sensor 104.

For instance, in one example, if the reflectance spectrum of the color sample can be directly measured, then the surface gloss value of the color sample can be used to adjust the reflectance values and to calculate the reflectance spectrum of the color sample under other measurement geometries. In other examples where the reflectance spectrum of the color sample cannot be directly measured, the raw measurement result (i.e., the 8-band raw counts) may be converted into reflectance with the help of a transformation matrix. Depending upon implementation, the transformation matrix may be obtained first, then the raw measurement result may be converted into a reflectance spectrum, and the result of the conversion may be adjusted using surface gloss. Alternatively, the raw measurement result may first be adjusted using surface gloss, a modified transformation matrix may subsequently be obtained, and then the raw measurement result may be converted into a reflectance spectrum using the modified transformation matrix. Where the raw measurement result is first adjusted using surface gloss (i.e., before applying the modified transformation matrix), there is no need to further adjust the reflectance spectrum using surface gloss.

Figure 2:
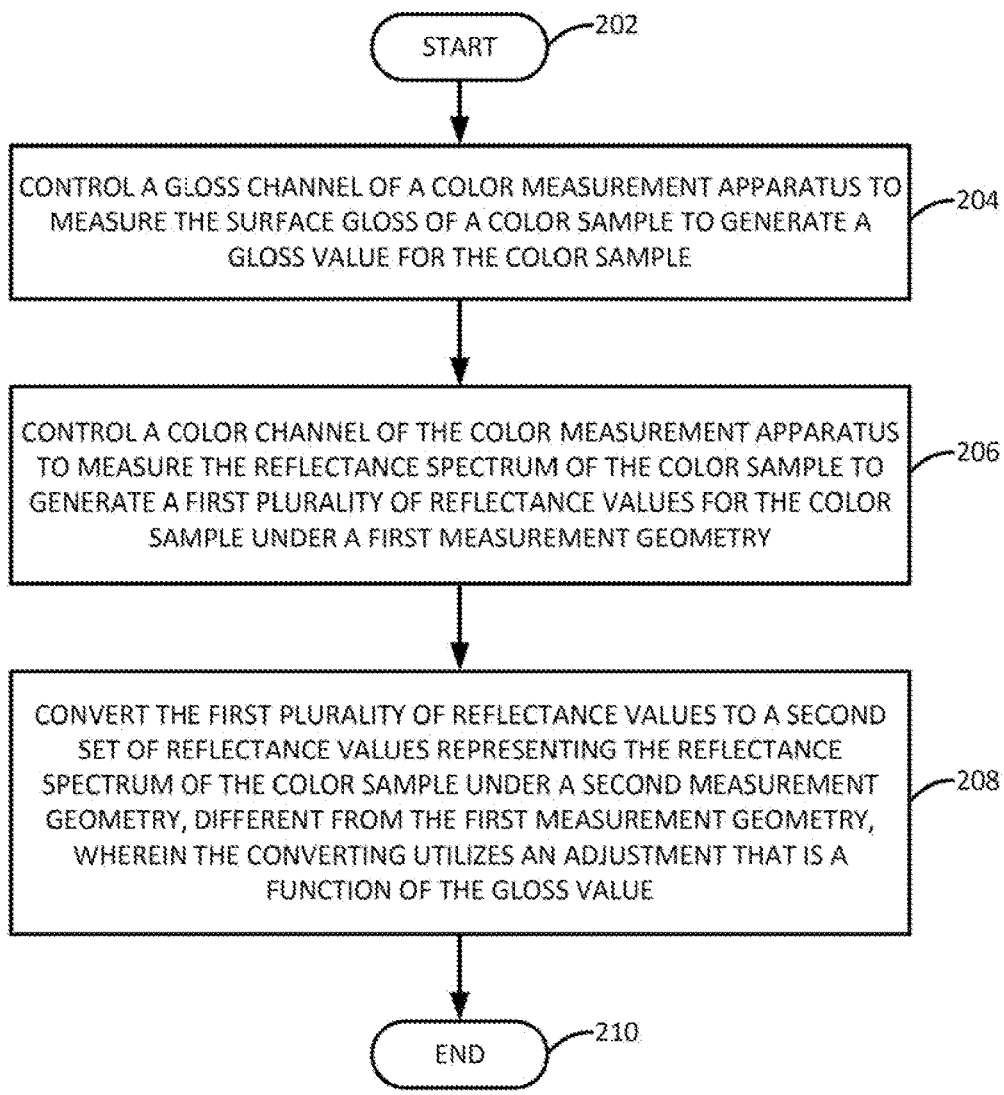
FIG. 2 is a flow chart illustrating one example of a method for converting a reflectance spectrum of a color sample measured under a first measurement geometry to a reflectance spectrum of the color sample under a second measurement geometry.

FIG. 2, for instance, is a flow chart illustrating one example of a method 200 for converting a reflectance spectrum of a color sample measured under a first measurement geometry to a reflectance spectrum of the color sample under a second measurement geometry.

In one example, the method 200 may be performed in whole or in part by the apparatus 100 illustrated in FIG. 1 and/or by another computing device that is communicatively coupled to the apparatus 100. In another example, the method 200 may be performed by a processor of a computing device that is communicatively coupled to a color measurement apparatus such as the apparatus 100, such as the processor 302 illustrated in FIG. 3. For the sake of example, the method 200 is described below as being performed by a processing system.

The method 200 begins in step 202. In step 204, the processing system may control a gloss channel of a color measurement apparatus to measure the surface gloss of a color sample to generate a gloss value for the color sample.

In one example, controlling the color measurement apparatus to measure the surface gloss of the color sample may comprise controlling a gloss light source of the color measurement apparatus (e.g., gloss light source 106 of the apparatus 100) to illuminate the color sample and controlling a gloss sensor of the color measurement apparatus (e.g., gloss sensor 108 of the apparatus 100) to detect the gloss of the color sample under the illumination from the gloss light source. Assuming that the color measurement apparatus has been calibrated to measure gloss as described above, controlling the color measurement apparatus to measure the surface gloss of the color sample may further comprise applying a transform to adjust the raw counts produced by the gloss sensor to generate the gloss value. In one example, the gloss value (after applying the transform) may be represented as g.

In step 206, the processing system may control a color channel of the color measurement apparatus to measure the reflectance spectrum of the color sample to generate a first plurality of reflectance values for the color sample under a first measurement geometry.

In one example, controlling the color measurement apparatus to measure the reflectance spectrum of the color sample may comprise controlling a color light source of the color measurement apparatus (e.g., color light source 102 of the apparatus 100) to illuminate the color sample and controlling a color sensor of the color measurement apparatus (e.g., color sensor 104 of the apparatus 100) to detect the reflectance spectrum of the color sample under the illumination from the color light source.

In one example, the first measurement geometry is a measurement geometry of the color channel of the color measurement apparatus. In one example, the measurement geometry of the color channel of the color measurement apparatus is 45/0. In this case, the directly measured reflectance spectrum of the color sample may be represented as $\text{refl}_{45}(\lambda)$.

However, in another example, the color measurement device may not be able to measure the reflectance spectrum of the color sample directly using a 45/0 measurement geometry. For instance, in one example, the color sensor of the color measurement apparatus may comprise an abridged eight-band color sensor. In this case, the processing system may control the color sensor to obtain an eight-band channel response of the color sensor to the color sample under the illumination from the color light source. Then the processing system may convert the eight-band channel response of the color sensor into the reflectance spectrum under the 45/0 measurement geometry. In one example, the processing system may use a transformation matrix, which may be derived during calibration of the color measurement device, to indirectly derive the reflectance spectrum under the 45/0 measurement geometry from the channel response of the color sensor. Several example techniques for deriving the transformation matrix are described in further detail below.

In step 208, the processing system may convert the first plurality of reflectance values to a second plurality of reflectance values representing the reflectance spectrum of the color sample under a second measurement geometry, different from the first measurement geometry, wherein the converting utilizes an adjustment that is a function of the gloss value.

As discussed above, an observable relationship exists between luminance values and gloss values for different measurement geometries. Thus, when the reflectance spectrum of the color sample can be directly measured under the 45/0 geometry, the first plurality of reflectance values can be adjusted to produce a second plurality of values under other measurement geometries. For instance, a first plurality of reflectance values measured under the 45/0 measurement geometry may be converted to a second plurality of reflectance values under an SCI measurement geometry according to the following relation:

$$\text{refl}_{SCI}(\lambda, g) = \text{refl}_{45}(\lambda) + \text{adj}_{45 \to SCI}(g) \quad \text{(EQN. 1)}$$

where $\text{adj}_{45 \to SCI}(g)$ is the amount of the adjustment to convert the first plurality of reflectance values under the 45/0 geometry to the second plurality of reflectance values under the SCI geometry. $\text{adj}_{45 \to SCI}(g)$ in this case is a function of the gloss value g of the color sample (e.g., as measured in step 204).

$\text{adj}_{45 \to SCI}(g)$ can be pre-determined and stored by measuring the surface glosses of a gloss ladder, as discussed above, with a 45/0 master color measurement apparatus and an SCI master color measurement apparatus. If the surface glosses measured with the 45/0 master color measurement apparatus are denoted as $\text{refl}_{45}(\lambda, g)$, and the surface glosses measured with the SCI master color measurement apparatus are denoted as $\text{refl}_{SCI}(\lambda, g)$, then $\text{adj}_{45 \to SCI}(g)$ may be computed as:

$$\text{adj}_{45 \to SCI}(g) = \text{refl}_{SCI}(\lambda, g) - \text{refl}_{45}(\lambda, g) \quad \text{(EQN. 2)}$$

and can be used later when measuring the reflectance spectra of other color samples.

For any sample in the gloss ladder, when $\text{refl}_{SCI}(\lambda, g)$ and $\text{refl}_{45}(\lambda)$, g can be directly measured during calibration of the color measurement apparatus, $\text{adj}_{45 \to SCI}(g)$ can be directly calculated. For any other samples (i.e., samples whose gloss values are not in the gloss ladder), $\text{adj}_{45 \to SCI}(g)$ can be obtained through an interpolation with known gloss ladder data.

For SCE measurement geometry, the reflectance spectrum $\text{refl}_{SCE}(\lambda,g)$ may be calculated as:

$$\text{refl}_{SCE}(\lambda,g)=\text{refl}_{45}(\lambda)+\text{adj}_{45\to SCE}(g) \quad (\text{EQN. 3})$$

where $\text{adj}_{4\to SCE}(g)$ is the amount of the adjustment to convert the first plurality of reflectance values under the 45/0 geometry to the second plurality of reflectance values under the SCE geometry. $\text{adj}_{45\to SCE}(g)$ in this case is a function of the gloss value g of the color sample (e.g., as measured in step 204).

$\text{adj}_{45\to SCE}(g)$ can be pre-determined and stored by measuring the surface glosses of a gloss ladder, as discussed above, with a 45/0 master color measurement apparatus and an SCE master color measurement apparatus. If the surface glosses measured with the 45/0 master color measurement apparatus are denoted as $\text{refl}_{45}(\lambda,g)$, and the surface glosses measured with the SCE master color measurement apparatus are denoted as $\text{refl}_{SCE}(\lambda,g)$, then $\text{adj}_{45\to SCE}(g)$ may be computed as:

$$\text{adj}_{45\to SCE}(g)=\text{refl}_{SCE}(\lambda,g)-\text{refl}_{45}(\lambda,g) \quad (\text{EQN. 4})$$

The method 200 may end in step 210.

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

Moreover, it should be noted that EQN. 3 can be generalized. For instance, EQN. 3 can be rewritten as $\text{refl}_2(\lambda,g)=\text{refl}_1(\lambda)+\text{adj}_{1\to 2}(g)$, where 1 and 2 represent any two different measurement geometries. However, depending upon the measurement geometries represented by 1 and 2, the value of $\text{adj}_{1\to 2}(g)$ may vary. Thus, a conversion may be performed between any two measurement geometries in a similar manner.

In some examples, the method 200 may be used to convert the reflectance spectrum of a color sample from a first measurement geometry to a second measurement geometry when the reflectance spectrum can be directly measured under the first measurement geometry. However, as discussed above, it may not be possible in some cases to directly measure the reflectance spectrum of the color sample under the first measurement geometry. For instance, if the color sensor of the color measurement apparatus is an abridged eight-band color sensor, then a transformation matrix may be needed to convert the eight-band sensor result into the reflectance spectrum under, for example, the 45/0 measurement geometry.

In one example, the transformation matrix may be derived during calibration of the color measurement apparatus. In this example, a plurality of calibration color standards having known reflectance spectra may be measured by the color channel of the color measurement apparatus during calibration, where all calibration color standards in the plurality of calibration color standards have similar surface gloss properties. In one example, "similar" surface gloss properties are understood to comprise surface glosses whose measurements are within some narrow threshold from each other (e.g., +/−x gloss units). In one example, the narrow threshold comprises five gloss units (i.e., x=5). However, it is also understood that the surface glosses of different samples may vary from zero to one hundred gloss units. In a rough application, all samples could be classified into five or six gloss categories (e.g., flat, eggshell, satin, semi-gloss, gloss, etc.). However, the transition from one gloss category to the next gloss category is not linear, so while the size of one gloss category may span five gloss units, the size of another category may span twenty gloss units.

In this case, the transformation matrix $M_{45}$ to convert the channel response of the multi-band color sensor into the reflectance spectrum of a 45/0 measurement geometry can be obtained as:

$$M_{45}=\text{pinv}(S)\cdot R_{45} \quad (\text{EQN. 5})$$

where S is a matrix of the channel responses of the multi-band color sensor to the plurality of color calibration standards, and $R_{45}$ is a matrix of reflectance measurements of the plurality of color calibration standards by a master 45/0 color measurement apparatus. In one example, each row in the matrix S contains a multi-band channel response of the multi-band color sensor to one calibration color standard of the plurality of color standards.

The transformation matrix $M_{45}$ can be used to convert the multi-band color sensor channel response into the reflectance spectrum of a 45/0 measurement geometry for any color sample according to:

$$r_{45}=s\cdot M_{45} \quad (\text{EQN. 6})$$

Where s is a row vector of the color sensor channel response, and $R_{45}$ is a row vector of the reflectance values of the color sample.

Once the transformation matrix $M_{45}$ has been used to convert a multi-band color sensor channel response into a reflectance spectrum of a 45/0 measurement geometry, the reflectance spectrum of the 45/0 measurement geometry can subsequently be converted to the reflectance spectrum of an SCI or SCE measurement geometry according to step 208 of the method 200 (and EQN. 1 or 3, respectively) as discussed above.

In another example, a transformation matrix $M_{SCI}$ can be obtained during calibration of the color measurement apparatus and can subsequently be used to convert the multi-band color sensor channel response into the reflectance spectrum of an SCI measurement geometry for any color sample according to:

$$M_{SCI}=\text{pinv}(U)\cdot R_{SCI} \quad (\text{EQN. 7})$$

where U is a matrix of channel responses of the multi-band color sensor to the plurality of color calibration standards and adjusted according to the known gloss values of the plurality of color calibration standards, and $R_{SCI}$ is a matrix of reflectance measurements of the plurality of color calibration standards by a master SCI color measurement apparatus.

In one example, the matrix S, described above, may be composed of direct measurement raw counts of the multi-band color sensor, as:

$$S = \begin{bmatrix} raw_{11} & raw_{12} & \cdots & raw_{1n} \\ raw_{21} & raw_{22} & \cdots & raw_{2n} \\ & \vdots & & \\ raw_{m1} & raw_{m2} & \cdots & raw_{mn} \end{bmatrix} \quad (\text{EQN. 8})$$

where $raw_{mn}$ denotes the raw counts of the multi-band color sensor for the $m^{th}$ color calibration standard at the $n^{th}$ band of the multi-band color sensor.

Similarly, the matrix U, described above, may be composed of the adjusted measurement raw counts of the multi-band color sensor, as:

$$U = \begin{bmatrix} raw_{adj11} & raw_{adj12} & & raw_{adj1n} \\ raw_{adj21} & raw_{adj22} & \cdots & raw_{adj2n} \\ & & \vdots & \\ raw_{adjm1} & raw_{adjm2} & \cdots & raw_{adjmn} \end{bmatrix} \quad \text{(EQN. 9)}$$

where $raw_{adjmn}$ denotes the adjusted raw counts of the multi-band color sensor for the $m^{th}$ color calibration standard at the $n^{th}$ band of the multi-band color sensor, and the raw counts are adjusted according to the surface gloss of the $m^{th}$ color calibration standard.

The surface gloss of the $m^{th}$ color calibration standard at the $n^{th}$ band of the multi-band color sensor, $raw_{adjmn}(g)$, can be obtained from the raw counts $raw_{mn}$ according to the relation:

$$raw_{adjmn}(g) = raw_{mn} + \text{dif-}f_n(g, g_0) \quad \text{(EQN. 10)}$$

where dif-$f_n$ (g,g$_0$) denotes the amount of the relative adjustment of the $n^{th}$ band of the multi-band color sensor as determined by the surface gloss g of the color calibration standard and a reference surface gloss g$_0$ chosen from the gloss ladder. For example, the multi-band color sensor may measure the sensor raw counts of the gloss ladder, so that for the $n^{th}$ band of the multi-band color sensor, a relation (e.g., $raw_n(g)$) can be established, through interpolation or other means, between the raw counts and the surface gloss.

In this example, any surface gloss in the gloss ladder may be selected as the reference surface gloss, and dif-$f_n$ (g,g$_0$) may be calculated as:

$$\text{dif-}f_n(g, g_0) = raw_n(g) - raw_n(g_0) \quad \text{(EQN. 11)}$$

In one example, the reference surface gloss g$_0$ may be selected to represent the majority (e.g., fifty-one percent or greater) of color samples that the color measurement apparatus is targeted to measure, or is selected to be close to zero for matte surface samples.

With the information of EQNs. 8-11, the transformation matrix $M_{SCI}$ can be readily calculated according to EQN. 7. Once the transformation matrix $M_{SCI}$ is calculated, the transformation matrix can be used to convert the channel response of the multi-band color sensor to a 45/0 reflectance spectrum for any color sample according to:

$$r_{SCI} = u \cdot M_{SCI} \quad \text{(EQN. 12)}$$

Where u is a row vector of the adjusted raw counts of the multi-band color sensor, and $r_{SCI}$ is a row vector of reflectance values of the color sample.

In one example, the same techniques embodied in EQNs. 7-12 can be used to convert the channel response of the multi-band color sensor to obtain the SCE reflectance spectrum for a color sample; SCE data simply replaces the SCI data in EQNs. 7-12. These same techniques may be used to obtain the SCE reflectance spectrum even if the color calibration standards include samples having varying surface gloss properties, because the measured raw counts of different color samples will have been adjusted with surface gloss according to EQN. 9.

Thus, the method 200 provides a method and color measurement apparatus for effectively and simultaneously measuring the surface gloss and the color of a sample.

Further examples of the method and apparatus are also able to obtain the reflectance spectrum of the sample under various geometries. The measured surface gloss can be used to improve the color measurement accuracy of the method and apparatus.

It should be noted that the method 200 may be expanded to include additional steps or may be modified to include additional operations with respect to the steps outlined above. In addition, although not specifically specified, one or more steps, functions, or operations of the method 200 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 2 that recite a determining operation or involve a decision do not necessarily require that both branches of the determining operation be practiced. In other words, one of the branches of the determining operation can be deemed as an optional step. Furthermore, steps, blocks, functions or operations of the above-described method can be combined, separated, and/or performed in a different order from that described above, without departing from the examples of the present disclosure.

Figure 3:
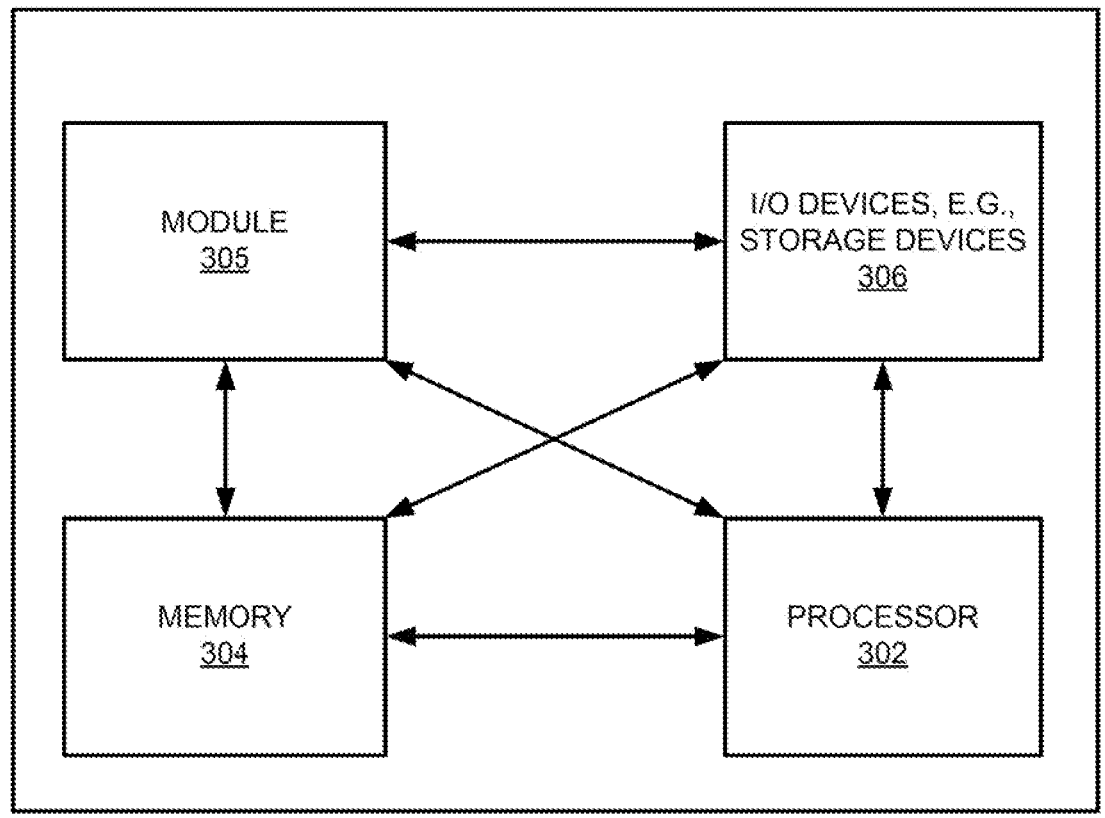
FIG. 3 is a high level block diagram of the calibration method that is implemented using a general purpose computing device.

FIG. 3 is a high-level block diagram of the surface gloss and reflectance spectrum measurement method that is implemented using a computing device 300. In one example, the computing device 300 may comprise a color measurement apparatus such as the color measurement apparatus 100 of FIG. 1, where the color measurement apparatus includes additional circuitry for estimating reflectance spectra of color samples from gloss values and for converting reflectance values of color samples measured under one measurement geometry to reflectance values measured under another measurement geometry, without the aid of an external computing device. In another example, the computing device 300 may comprise a computing system that is separate from the color measurement device, where the color measurement device simply illuminates a color sample and obtains sensor responses of gloss and color sensors, and then transmits these sensor responses to the separate computing system for further processing (e.g., including estimating reflectance spectra of color samples from responses of the gloss sensor and converting reflectance values of color samples measured under one measurement geometry to reflectance values measured under another measurement geometry).

As depicted in FIG. 3, the computing device 300 comprises a hardware processor element 302, e.g., a central processing unit (CPU), a microprocessor, or a multi-core processor, a memory 304, e.g., random access memory (RAM) and/or read only memory (ROM), a module 305 for simultaneously measuring the surface gloss and reflectance spectrum of a color sample, and various input/output devices 306, e.g., storage devices, including but not limited to, a tape drive, a floppy drive, a hard disk drive or a compact disk drive, a receiver, a transmitter, a display, an output port, an input port, and a user input device, such as a keyboard, a keypad, a mouse, a microphone, a camera, a laser light source, an LED light source, and the like.

Although one processor element is shown, it should be noted that the computing device 300 may employ a plurality of processor elements. Furthermore, although one computing device 300 is shown in the figure, if the method(s) as discussed above is implemented in a distributed or parallel manner for a particular illustrative example, i.e., the blocks of the above method(s) or the entire method(s) are implemented across multiple or parallel electronic devices, then the computing device 300 of this figure is intended to represent each of those multiple electronic devices.

It should be noted that the present disclosure can be implemented by machine readable instructions and/or in a combination of machine readable instructions and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the blocks, functions and/or operations of the above disclosed method(s).

In one example, instructions and data for the present module or process 305 for simultaneously measuring the surface gloss and reflectance spectrum of a color sample, e.g., machine readable instructions can be loaded into memory 304 and executed by hardware processor element 302 to implement the blocks, functions or operations as discussed above in connection with the method 200. For instance, where the computing device 300 comprises the color measurement apparatus, the module or process 305 for simultaneously measuring the surface gloss and reflectance spectrum of a color sample may include hardware for measuring the glosses and reflectance spectra of color samples, such as light sources, gloss sensors, color sensors, other optics (e.g., lenses, mirrors, etc.) and the like. The memory 304 may store transformation matrices and adjustments for use in, for example, adjusting reflectance values to account for the gloss of a sample, converting reflectance values measured under one measurement geometry to reflectance values measured under another measurement geometry, and the like. Furthermore, when a hardware processor executes instructions to perform "operations", this could include the hardware processor performing the operations directly and/or facilitating, directing, or cooperating with another hardware device or component, e.g., a separate color measurement apparatus, a co-processor, or the like, to perform the operations.

The processor executing the machine readable instructions relating to the above-described method(s) can be perceived as a programmed processor or a specialized processor. As such, the present module 305 for simultaneously measuring the surface gloss and reflectance spectrum of a color sample of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or an electronic device such as a computer or a controller of a color measurement apparatus.

It will be appreciated that variants of the above-disclosed and other features and functions, or alternatives thereof, may be combined into many other different systems or applications. Various presently unforeseen or unanticipated alternatives, modifications, or variations therein may be subsequently made which are also intended to be encompassed by the following claims.

What is claimed is:

1. A method, comprising:
controlling, by a processing system including at least one processor, a gloss channel of a color measurement apparatus to measure a surface gloss of a color sample to generate a gloss value for the color sample;
controlling, by the processing system, a color channel of the color measurement apparatus to measure a reflectance spectrum of the color sample to generate a first plurality of reflectance values for the color sample under a first measurement geometry, wherein the reflectance spectrum is measured indirectly under the first measurement geometry, wherein the controlling the color channel of the color measurement apparatus to measure the reflectance spectrum of the color sample comprises converting a channel response of a multi-band color sensor of the color channel into the first plurality of reflectance values using a transformation matrix that is derived during a calibration of the color measurement apparatus, and wherein the calibration utilizes a plurality of color calibration standards having known gloss values; and
converting, by the processing system, the first plurality of reflectance values to a second plurality of reflectance values representing the reflectance spectrum of the color sample under a second measurement geometry, different from the first measurement geometry, wherein the converting comprises adjusting the first plurality of reflectance values by an amount that is calculated directly from the gloss value that is generated.

2. The method of claim 1, wherein the first measurement geometry is a 45/0 measurement geometry.

3. The method of claim 2, wherein the reflectance spectrum is measured directly under the first measurement geometry, and wherein the second measurement geometry is a specular reflectance included measurement geometry.

4. The method of claim 3, wherein the amount is denoted as $adj_{45 \to SCI}(g)$ and calculated as $adj_{45 \to SCI}(g) = refl_{SCI}(\lambda, g) - refl_{45}(\lambda, g)$, wherein $refl_{45}(\lambda, g)$ denotes the first plurality of reflectance values, and $refl_{SCI}(\lambda, g)$ denotes the second plurality of reflectance values.

5. The method of claim 2, wherein the reflectance spectrum is measured directly under the first measurement geometry, and wherein the second measurement geometry is a specular reflectance excluded measurement geometry.

6. The method of claim 5, wherein the amount is denoted as $adj_{45 \to SCE}(g)$ and calculated as $adj_{45 \to SCE}(g) = refl_{SCE}(\lambda, g) - refl_{45}(\lambda, g)$, wherein $refl_{45}(\lambda, g)$ denotes the first plurality of reflectance values, and $refl_{SCE}(\lambda, g)$ denotes the second plurality of reflectance values.

7. The method of claim 1, wherein the first plurality of reflectance values comprises a 45/0 reflectance spectrum.

8. The method of claim 7, wherein the multi-band color sensor comprises an abridged eight-band color sensor.

9. The method of claim 1, wherein the plurality of color calibration standards have surface gloss properties that deviate from each other within a defined threshold.

10. The method of claim 9, wherein a row vector of the first plurality of reflectance values is obtained by multiplying the transformation matrix by a row vector of the channel response of the multi-band color sensor.

11. A non-transitory computer-readable medium storing instructions which, when executed by a processing system including at least one processor, cause the processing system to perform operations, the operations comprising:

controlling a gloss channel of a color measurement apparatus to measure a surface gloss of a color sample to generate a gloss value for the color sample;

controlling a color channel of the color measurement apparatus to measure a reflectance spectrum of the color sample to generate a first plurality of reflectance values for the color sample under a first measurement geometry, wherein the first measurement geometry is a 45/0 measurement geometry, and wherein the reflectance spectrum is measured directly under the first measurement geometry; and converting the first plurality of reflectance values to a second plurality of reflectance values representing the reflectance spectrum of the color sample under a second measurement geometry, different from the first measurement geometry, wherein the second measurement geometry is a specular reflectance included measurement geometry, wherein the converting comprises adjusting the first plurality of reflectance values by an amount that is calculated based directly from the gloss value that is generated, and wherein the amount is denoted as $adj_{45 \to SCI}(g)$ and calculated as $adj_{45 \to SCI}(g) = refl_{SCI}(\lambda, g) - refl_{45}(\lambda, g)$, wherein $refl_{45}(\lambda, g)$ denotes the first plurality of reflectance values, and $refl_{SCI}(\lambda, g)$ denotes the second plurality of reflectance values.

12. An apparatus, comprising:

a processing system including at least one processor; and a non-transitory computer-readable medium storing instructions which, when executed by the processing system, cause the processing system to perform operations, the operations comprising:

controlling a gloss channel of a color measurement apparatus to measure a surface gloss of a color sample to generate a gloss value for the color sample;

controlling a color channel of the color measurement apparatus to measure a reflectance spectrum of the color sample to generate a first plurality of reflectance values for the color sample under a first measurement geometry, wherein the first measurement geometry is a 45/0 measurement geometry, and wherein the reflectance spectrum is measured directly under the first measurement geometry; and converting the first plurality of reflectance values to a second plurality of reflectance values representing the reflectance spectrum of the color sample under a second measurement geometry, different from the first measurement geometry, wherein the second measurement geometry is a specular reflectance excluded measurement geometry, wherein the converting comprises adjusting the first plurality of reflectance values by an amount that is calculated directly from the gloss value that is generated, wherein the amount is denoted as $adj_{45 \to SCE}(g)$ and calculated as $adj_{45 \to SCE}(g) = refl_{SCE}(\lambda, g) - refl_{45}(\lambda, g)$, wherein $refl_{45}(\lambda, g)$ denotes the first plurality of reflectance values, and $refl_{SCE}(\lambda, g)$ denotes the second plurality of reflectance values.

13. The method of claim 1, wherein the controlling the gloss channel comprises applying a transform to adjust raw counts produced by a gloss sensor of the gloss channel to generate the gloss value.

14. The method of claim 13, wherein the transform is obtained during a calibration of the color measurement apparatus.

15. The method of claim 1, wherein the gloss channel comprises a sixty degree gloss channel.

16. The method of claim 2, wherein the color measurement apparatus comprises a 45/0 spectrophotometer.

17. The non-transitory computer-readable medium of claim 11, wherein the controlling the gloss channel comprises applying a transform to adjust raw counts produced by a gloss sensor of the gloss channel to generate the gloss value.

18. The non-transitory computer-readable medium of claim 17, wherein the transform is obtained during a calibration of the color measurement apparatus.

19. The apparatus of claim 12, wherein the controlling the gloss channel comprises applying a transform to adjust raw counts produced by a gloss sensor of the gloss channel to generate the gloss value.

20. The apparatus of claim 19, wherein the transform is obtained during a calibration of the color measurement apparatus.

* * * * *